(No Model.)
M. L. SMITH.
PRUNING KNIFE AND SAW COMBINED.
No. 319,033. Patented June 2, 1885.
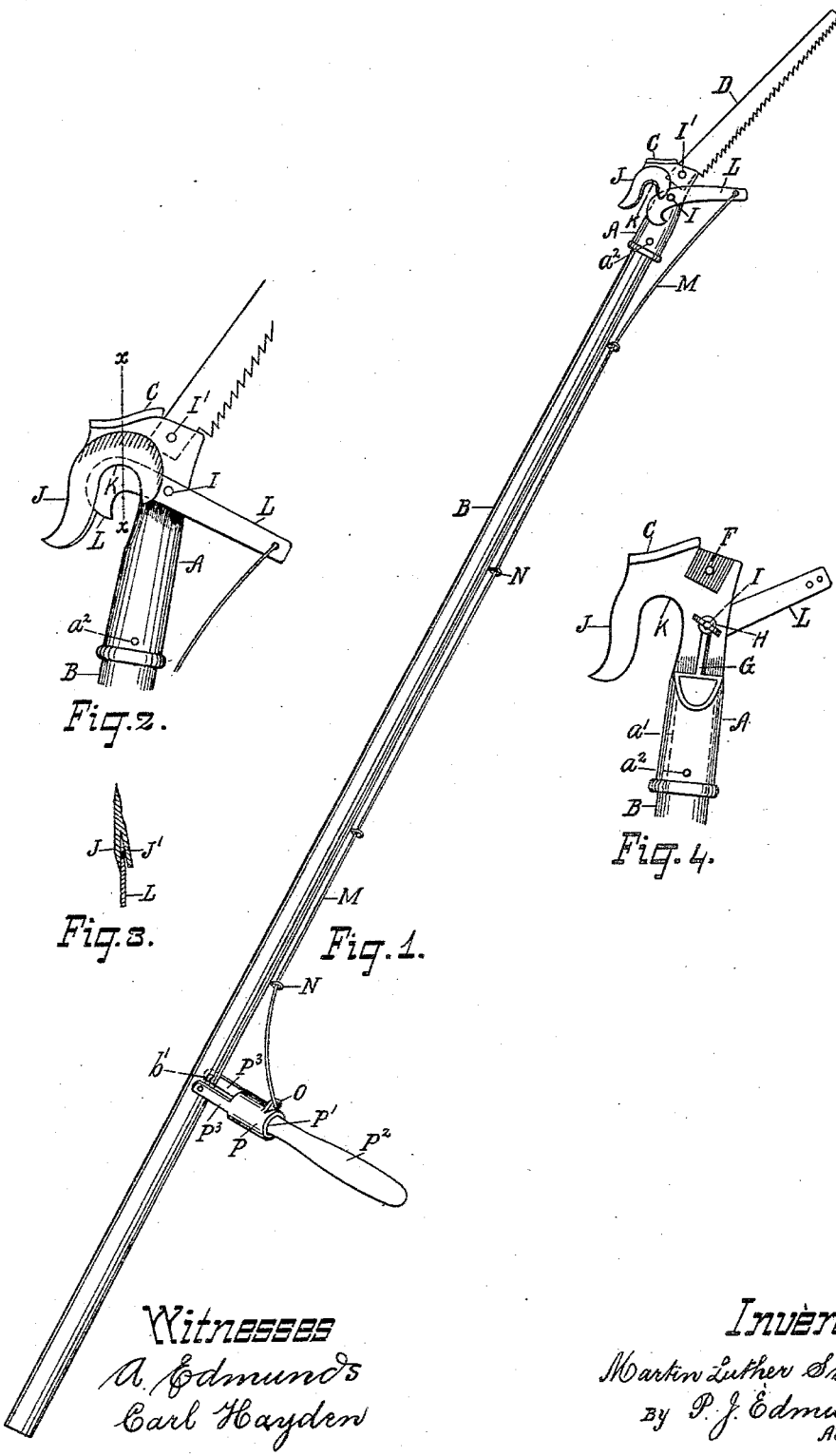
Witnesses
A. Edmunds
Carl Hayden
Inventor
Martin Luther Smith
By P. J. Edmunds
Attorney

UNITED STATES PATENT OFFICE.

MARTIN LUTHER SMITH, OF TORONTO, ONTARIO, CANADA.

PRUNING KNIFE AND SAW COMBINED.

SPECIFICATION forming part of Letters Patent No. 319,033, dated June 2, 1885.

Application filed March 2, 1885. (No model.)

*To all whom it may concern:*

Be it known that I, MARTIN LUTHER SMITH, a subject of the Queen of Great Britain, and a resident of the city of Toronto, in the county of York, in the Province of Ontario, Canada, manufacturer, have invented certain new and useful Improvements on a Combined Pruning Knife and Saw, of which the following is a specification.

This invention relates to a pruning or cutting tool provided with a cutting knife-blade or shear and saw for trimming fruit and other trees; and it consists of the improved construction and combination of parts of the same, which will be hereinafter more fully described and claimed, reference being had to the accompanying drawings, wherein—

Figure 1 is a perspective view of a pruning-tool embodying my invention. Fig. 2 is an enlarged detail view of the head of same. Fig. 3 is a sectional view on the line $x\ x$ of Fig. 2. Fig. 4 is a view of the opposite side of the head to that shown in Fig. 2.

A designates a head cast in malleable iron or other suitable material, which head A is cast hollow at the lower end, in which hollow (designated by the dotted line $a'$) the handle B is socketed and rigidly secured by the pin or bolt $a^2$. This head A is constructed with a chisel, C, a square recess, F, a raised strengthening-brace, G, between the upper end of the handle-socket and the projection H around the bolt-hole, through which the bolt I passes, and also with a curved hook, J, which forms the semicircular opening K.

The square end of the saw D is set in or bedded in the corresponding recess F in the upper part of the head A, and the saw D is rigidly secured to the head A by a thumb-nut and bolt, I'. The advantage of inserting the square end of the saw in this recess F is that the saw does not wear on the bolt I', and, further, the saw is prevented from turning on the said bolt I' when sawing; and the teeth of the saw are not in a line with the handle B, but are set with a downward incline, as shown in Fig. 1 of annexed drawings. The advantage of placing the teeth of the saw in this position is that they are more effective in sawing off large branches, which are incapable of being cut with a knife.

The teeth of the saw D are constructed to cut only when pulling down on the saw, which prevents the saw from bending or buckling, which is only caused by sawing when pushing the saw upward.

It will readily be seen that the saw D may be easily and quickly attached and removed from the head A when not required for use by unloosening the thumb-nut on the bolt I', and it may be readily and easily secured in position again when required for use.

The knife L is constructed with a steel cutting-edge, and usually in the form shown, and is secured to the head A by a thumb-nut and bolt, I, on which bolt I the knife L is pivoted.

A strong wire rod, M, is fastened to the outer end of the knife, as shown in Figs. 1 and 2 of annexed drawings. This wire M passes along the handle B through the eyes of the screw-eyes N, rigidly secured in said handle B, to the flange O, projecting upward from the forked socket-arm P, to which flange O the lower end of the wire M is connected. In a socket, P', in this arm P the lever $P^2$ is secured, and the forks $P^3$ of this socket-arm P are pivotally secured to the handle B by a bolt, $b'$, passing through the handle B and through the two forks $P^3$, respectively. This curved hook J is provided with a notched recess, J', on its curved inner face, in which recess J' the knife L passes after cutting, as shown in Fig. 3 of annexed drawings. With a notched recess, J', the hook J is much stronger, and the tendency of the branch to bend in cutting and pry the knife L away from the curved hook J is completely avoided and prevented.

The operation is as follows: When pruning the tree with the knife L, the curved hook J is placed over the bough until the bough is in the semicircular opening K, when the lever $P^2$ is then pressed downward, which, through the wire rod M, causes the knife L to cut the bough by pressing the bough between the sharp steel edge of the knife L and inner face of the curved hook J.

Having thus described my invention, I claim—

The combination of the head A, provided with socket $a'$, recess F, and brace G, with the chisel C, curved hook J, provided with notched recess J' and knife L, substantially as shown and described, and for the purpose specified.

In testimony whereof I affix my signature in the presence of the two undersigned witnesses.

MARTIN LUTHER SMITH.

Witnesses:
P. J. EDMUNDS,
A. EDMUNDS.